United States Patent
Colyandro, Jr.

(10) Patent No.: US 11,765,195 B2
(45) Date of Patent: Sep. 19, 2023

(54) DISTRIBUTED NETWORK-LEVEL PROBABILISTIC ATTACK GRAPH GENERATION

(71) Applicant: ICF International, Fairfax, VA (US)

(72) Inventor: Anthony Thomas Colyandro, Jr., Silver Spring, MD (US)

(73) Assignee: ICF International, Fairfax, VA (US)

( * ) Notice: Subject to any disclaimer, the term of this patent is extended or adjusted under 35 U.S.C. 154(b) by 308 days.

(21) Appl. No.: 17/176,521

(22) Filed: Feb. 16, 2021

(65) Prior Publication Data

US 2022/0263850 A1   Aug. 18, 2022

(51) Int. Cl.
*H04L 29/00*   (2006.01)
*H04L 9/40*   (2022.01)

(52) U.S. Cl.
CPC ............................. *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 6,442,694 B1 | 8/2002 | Bergman et al. | |
| 7,627,900 B1 * | 12/2009 | Noel | H04L 63/1425 709/224 |
| 7,950,058 B1 | 5/2011 | Rockwood | |
| 8,266,697 B2 | 9/2012 | Coffman | |
| 8,683,546 B2 * | 3/2014 | Dunagan | G06F 21/577 726/1 |
| 8,881,288 B1 * | 11/2014 | Levy | G06F 21/577 709/225 |
| 9,166,997 B1 * | 10/2015 | Guo | G06F 21/554 |
| 9,167,004 B2 | 10/2015 | Pappu et al. | |
| 9,183,387 B1 * | 11/2015 | Altman | G06F 21/56 |
| 9,210,185 B1 | 12/2015 | Pinney Wood et al. | |
| 9,292,695 B1 * | 3/2016 | Bassett | G06F 21/577 |
| 9,537,884 B1 * | 1/2017 | Raugas | H04L 63/1433 |
| 9,560,065 B2 | 1/2017 | Neil et al. | |
| 9,661,019 B2 | 5/2017 | Liu | |
| 9,692,768 B1 | 6/2017 | Kayyoor et al. | |
| 9,792,200 B2 | 10/2017 | Plate et al. | |
| 9,846,780 B2 * | 12/2017 | Tonn | H04L 63/1441 |
| 9,894,090 B2 * | 2/2018 | Hebert | H04L 63/1408 |
| 9,992,219 B1 * | 6/2018 | Hamlet | H04L 63/1433 |
| 10,122,740 B1 * | 11/2018 | Finkelshtein | H04L 63/1441 |

(Continued)

FOREIGN PATENT DOCUMENTS

| | | | |
|---|---|---|---|
| CN | 108123962 A | | 6/2018 |
| CN | 111880708 A | * | 11/2020 |

*Primary Examiner* — Don G Zhao
(74) *Attorney, Agent, or Firm* — Fredrikson & Byron, P.A.

(57) ABSTRACT

A method for generating a network-level attack graph is described. A first computing device in a network generates a first attack graph and transmits the first attack graph to a central computing device in the network. A second computing device in the network generates a second attack graph, wherein the second computing device is different than the first computing device, and transmits the second attack graph to the central computing device. The central computing device generates, based on the first attack graph and the second attack graph, a network-level attack graph by merging the first attack graph, the second attack graph, and an attack graph stencil of cross-device vulnerability interactions.

15 Claims, 5 Drawing Sheets

(56) References Cited

U.S. PATENT DOCUMENTS

| | | | |
|---|---|---|---|
| 10,277,625 B1 | 4/2019 | Efstathopoulos et al. | |
| 10,404,741 B2 | 9/2019 | Peteroy et al. | |
| 10,511,616 B2* | 12/2019 | Leiderfarb | H04L 63/1441 |
| 10,560,364 B1* | 2/2020 | Kondaveeti | H04L 67/10 |
| 10,574,683 B1 | 2/2020 | Ghosh et al. | |
| 10,706,144 B1* | 7/2020 | Moritz | G06F 21/55 |
| 10,749,893 B1* | 8/2020 | Dahlberg | G06Q 10/067 |
| 10,754,959 B1* | 8/2020 | Rajasooriya | G06N 7/01 |
| 11,140,179 B1* | 10/2021 | Infante-Lopez | H04L 63/1416 |
| 11,269,995 B2* | 3/2022 | Marwah | H04L 41/0654 |
| 11,277,432 B2* | 3/2022 | Hassanzadeh | G06F 21/577 |
| 11,363,057 B1* | 6/2022 | Talbot | H04L 63/1441 |
| 11,483,335 B1* | 10/2022 | Tsokos | H04L 63/1433 |
| 11,556,636 B2* | 1/2023 | Neil | G06F 21/577 |
| 2006/0021044 A1* | 1/2006 | Cook | H04L 63/1433 726/25 |
| 2007/0226796 A1* | 9/2007 | Gilbert | G06F 21/577 726/25 |
| 2008/0098479 A1* | 4/2008 | O'Rourke | H04L 63/1433 726/25 |
| 2008/0240711 A1* | 10/2008 | Liu | H04B 10/0793 398/9 |
| 2009/0113552 A1* | 4/2009 | Jin | G06F 21/577 726/25 |
| 2010/0192195 A1* | 7/2010 | Dunagan | G06F 21/577 726/1 |
| 2012/0290427 A1* | 11/2012 | Reed | G06Q 50/01 705/26.43 |
| 2012/0324572 A1 | 12/2012 | Gordon et al. | |
| 2015/0244734 A1* | 8/2015 | Olson | G06F 21/577 726/25 |
| 2015/0381649 A1* | 12/2015 | Schultz | G06Q 10/0635 726/25 |
| 2016/0065598 A1* | 3/2016 | Modi | H04L 63/1408 726/23 |
| 2016/0205122 A1* | 7/2016 | Bassett | H04L 63/1416 726/23 |
| 2016/0219066 A1 | 7/2016 | Vasseur et al. | |
| 2017/0171225 A1* | 6/2017 | Pal | H04L 63/1416 |
| 2017/0171240 A1* | 6/2017 | Arzi | H04L 63/1416 |
| 2017/0279836 A1 | 9/2017 | Vasseur et al. | |
| 2017/0279839 A1 | 9/2017 | Vasseur et al. | |
| 2017/0302691 A1* | 10/2017 | Singh | H04L 63/1458 |
| 2018/0048661 A1 | 2/2018 | Bird et al. | |
| 2018/0197128 A1* | 7/2018 | Carstens | G06F 16/9024 |
| 2018/0241762 A1 | 8/2018 | Savalle et al. | |
| 2019/0052663 A1* | 2/2019 | Lee | H04L 63/20 |
| 2019/0173923 A1* | 6/2019 | Skowyra | H04L 63/1441 |
| 2020/0053116 A1* | 2/2020 | Soroush | H04L 43/045 |
| 2020/0067969 A1* | 2/2020 | Abbaszadeh | G06N 20/10 |
| 2020/0226425 A1* | 7/2020 | Zhang | G06F 18/217 |
| 2020/0244691 A1* | 7/2020 | Veeramany | H04L 63/0236 |
| 2021/0064762 A1* | 3/2021 | Salji | G06F 9/455 |
| 2021/0105294 A1* | 4/2021 | Kruse | H04L 63/145 |
| 2021/0133331 A1* | 5/2021 | Lipkis | H04L 63/145 |
| 2021/0136089 A1* | 5/2021 | Costea | G06F 21/554 |
| 2021/0194924 A1* | 6/2021 | Heinemeyer | G06F 21/577 |
| 2021/0288995 A1* | 9/2021 | Attar | H04L 41/0879 |
| 2021/0311860 A1* | 10/2021 | Botea | G06F 11/3688 |
| 2022/0014534 A1* | 1/2022 | Basovskiy | H04L 63/1425 |
| 2022/0043911 A1* | 2/2022 | Pomerantsev | G06F 21/53 |
| 2022/0138261 A1* | 5/2022 | Ogrinz | G06F 16/287 707/798 |
| 2022/0263850 A1* | 8/2022 | Colyandro, Jr. | H04L 63/1433 |
| 2022/0360597 A1* | 11/2022 | Fellows | G06F 21/577 |
| 2023/0056552 A1* | 2/2023 | Kinoshita | G06F 21/577 |

* cited by examiner

DISTRIBUTED NETWORK-LEVEL PROBABILISTIC ATTACK GRAPH GENERATION

TECHNICAL FIELD

The disclosure relates to network security.

BACKGROUND

Network security systems rely on the ability to monitor vulnerabilities within a network in order to identify vulnerabilities that would be subject to potential malicious activity that may be considered harmful. In particular, network security systems seek to identify unwanted system vulnerabilities that would allow attackers to gain access to assets compromising the confidentiality, integrity, or accessibility of network assets, so that appropriate action may be taken in response to the risk. The system can include computer systems, applications, networks, or any combination thereof. The risk due to vulnerabilities is partially characterized in a threat-based approach where a wide array of attackers, ranging from the initiate, to organized crime to nation-states, are always looking for a way to compromise a network against defenders with limited resources of time, personnel, and funding. Due to the nature of the risk of vulnerabilities, it is recommended that the cyber situational awareness tools require frequent updates which most organizations cannot or do not abide.

SUMMARY

In general, the disclosure describes a methodology for a distributed generation of attack graphs locally and then managing and merging the subgraphs into an enclave level attack graph. The method includes the steps of generating a graph, transmitting and receiving a graph, and merging the subgraph into a larger enclave-level graph where at least one of the steps is carried out using a computer device.

Further, there are a large number of compute cycles and network bandwidth available during off hours. This disclosure describes a process to utilize those down time resources to improve the cyber situational awareness by using these resources, on a daily basis, if not more frequently, to generate a daily or more frequent, enclave-level attack graph for each machine local to the enclave, on that individual machine, and then collate the individual attack graphs into an enclave level attack graph.

This method leverages each of the machine-level assets within an enclave to generate its own attack graph and, by sharing the data with a central processing unit, can generate an enclave-wide probabilistic attack graph. This can be extended by generating enclave-level attack graphs at individual machines and sending the enclave-level attack graphs to a central server to generate a full network-level attack graph if the network includes multiple enclaves. The benefits of this method are that by distributing part of the attack graph generation to individual machines, the computational load is shared during low compute-activity and low network-activity times and thus more frequent cyber-situational awareness can be gained for a daily or even more frequent period. The benefit of more frequent scanning cannot be over-stated especially if the computational and network loads are reduced. Another benefit to this method is that each machine in the enclave can provide its' perspective of itself in the network versus a more assumed perspective based on network tools. Furthermore, the individual machines in the separate enclaves can produce updated attack graphs, compare the updated attack graphs to prior attack graphs, and only transmit the differences between those two attack graphs to the central processing unit, thereby reducing the amount of overall network traffic by reducing the amount of data transmitted between those devices over the network.

In one example, the disclosure is directed to a method in which a first computing device in a network generates a first attack graph. The method further includes generating, by a second computing device in the network, a second attack graph, wherein the second computing device is different than the first computing device. The method also includes transmitting, by the first computing device, the first attack graph from the first computing device to a third computing device in the network, wherein the third computing device is different than the first computing device and the second computing device. The method further includes transmitting, by the second computing device, the second attack graph from the second computing device to the third computing device. The method also includes generating, by the third computing device and based on the first attack graph and the second attack graph, a network-level attack graph by merging the first attack graph, the second attack graph, and an attack graph stencil of cross-device vulnerability interactions.

In another example, the disclosure is directed to a server device that includes one or more communication units configured to communicate with each of a plurality of computing devices in a network, the plurality of computing devices including a first computing device and a second computing device. The server device also includes one or more processors configured to receive, via the one or more communication units, a first attack graph from the first computing device, receive, via the one or more communication units, a second attack graph from the second computing device, access a comprehensive list of known vulnerabilities, determine an operating system for each computing device of the plurality of computing devices in the network, determine each unique operating system pair based on the operating system for each computing device of the plurality of computing devices, for each unique operating system pair, determine, based on the comprehensive list of known vulnerabilities, each interaction vulnerability for the respective unique operating system pair to generate an attack graph stencil of cross-device vulnerability interactions, and generate, based on the first attack graph and the second attack graph, a network-level attack graph by merging the first attack graph, the second attack graph, and the attack graph stencil.

In another example, the disclosure is directed to a system comprising a network comprising a plurality of computing devices. The plurality of computing devices includes at least a first computing device, a second computing device different than the first computing device, and a third computing device different than the first computing device and the second computing device. The first computing device is configured to generate a first attack graph and transmit the first attack graph to the third computing device. The second computing device is configured to generate a second attack graph and transmit the second attack graph to the third computing device. The third computing device is configured to generate, based on the first attack graph and the second attack graph, a first network-level attack graph by merging the first attack graph, the second attack graph, and an attack graph stencil of cross-device vulnerability interactions. The first computing device is further configured to generate a third attack graph, generate a first delta attack graph that includes only differences between the third attack graph and the first attack graph, and transmit the first delta attack graph to the third computing device. The second computing device is further configured to generate a fourth attack graph, generate a second delta attack graph that includes only differences between the fourth attack graph and the second attack graph, and transmit the second delta attack graph to the third computing device. The third computing device is further configured to construct the third attack graph from the first attack graph and the first delta attack graph, construct the fourth attack graph from the second attack graph and the second delta attack graph, and generate, based on the third attack graph and the fourth attack graph, a second network-level attack graph by merging the third attack graph, the fourth attack graph, and a second attack graph stencil of cross-device vulnerability interactions.

In another example, the disclosure is directed to a non-transitory computer-readable storage medium containing instructions. The instructions, when executed, cause one or more processors to perform any of the techniques described herein.

In another example, the disclosure is directed to a method comprising any of the techniques described herein.

In another example, the disclosure is directed to a computing device configured to perform any of the techniques described herein.

In another example, the disclosure is directed to a system including one or more computing devices, wherein the system as a whole is configured to perform any of the techniques described herein.

In another example, the disclosure is directed to an apparatus comprising means for performing any of the techniques described herein.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
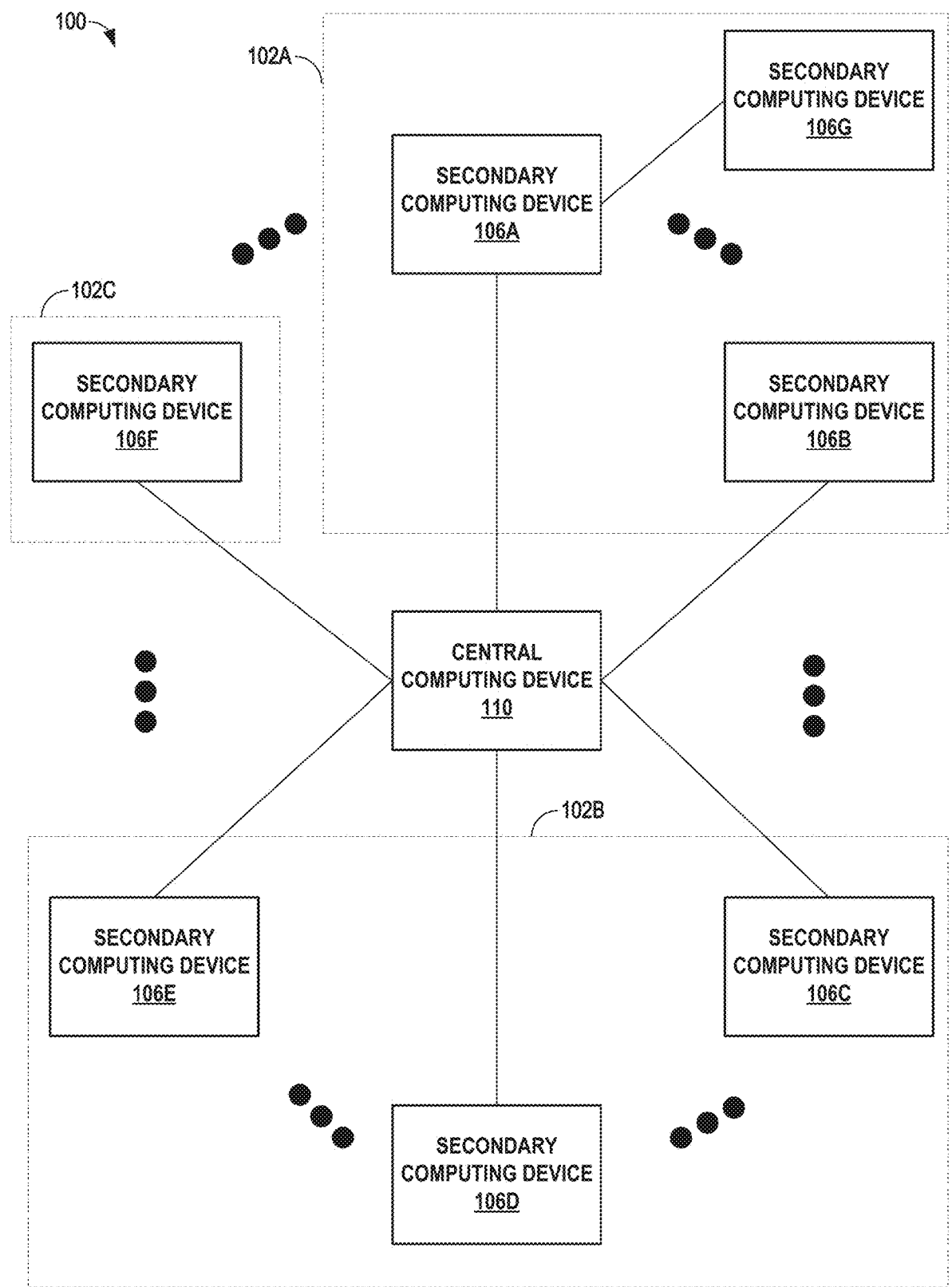
FIG. 1 is a block diagram illustrating an example network with multiple enclaves, in accordance with one or more techniques described herein.

FIG. 1 is a block diagram illustrating an example network 100 with multiple enclaves 102A-102C, in accordance with one or more techniques described herein. Each of enclaves 102A-102C includes a number of secondary computing devices 106A-106G. Some enclaves may include multiple levels of secondary computing devices (e.g., enclave 102A includes at least one secondary computing device (106G) with a traceroute distance from central computing device 110 of 2 hops). Some enclaves may include multiple secondary computing devices with a traceroute distance from central computing device 110 of 1 hop (e.g., enclave 102B includes at least secondary computing devices 106C-106E, which are all only 1 hop from central computing device 110). Some enclaves may only include a single secondary computing device (e.g., enclave 102C includes only secondary computing device 106F). However, these are only a few examples of enclave configurations, and any enclave configuration may be suitable for the techniques described herein. For instance, in other examples, each of secondary computing devices 106A-106G may be located in a same enclave, and the network-level attack graph generated by central computing device 110 may be the enclave-level attack graph. In other words, the techniques described herein may be utilized to generate enclave-level attack graphs from multiple individual attack graphs within a same enclave, or to generate network-level attack graphs from multiple individual attack graphs, with at least two of those individual attack graphs being in different enclaves.

The method here leverages mathematical work on adjacency matrices and graph theory. The techniques described herein include merging sub-graphs to form a larger graph structure for proper information extraction from the attack graph. To carry out this process, several algorithms are utilized which merge two community subgraphs into a single graph. For the techniques described herein, individual attack graphs may be generated on a machine-level (e.g., secondary computing device 106A-106G) and central computing device 110 may merge the individual attack graphs utilizing an overlapping attack path stencil which represents how vulnerabilities interact across different machines, thereby joining the individual attack graphs into a merged attack graph.

An aspect of the techniques described herein is, after data collection and transmission, central computing device 110 matches sections of the individual attack graphs according to their relative connections between one another and how the vulnerabilities interact between them and to make available of initial form of merged enclave-level adjacency matrix. Central computing device 110 also creates an adjacency matrix vulnerability-based attack graph, and central computing device 110 may use another algorithm for the adjacency matrices of enclave graph and the creation of merged community enclave-level attack graph adjacency matrix.

It should be noted that the techniques described herein can be extended beyond common vulnerabilities and exposures (CVEs) to include additional attack graph-based layers such as configuration control items (CCI), flow data, IoT, user-type, course-of-action recommendations, etc. in a graph-theory based temporal multiplex to enhance the cyber-situational awareness for risk mitigation.

As new vulnerabilities are discovered, many vendors and developers share this information with the general cybersecurity community. The data is published by a variety of sources such as the National Institute of Science and Technology (NIST), National Vulnerability Database (NVD) or the OpenVAS community Network Vulnerability Tests (NVT) feed. These are examples of extensible markup language (XML) files which contain vulnerability information which can be used as the basis of a vulnerability scan. The combination of the vulnerability data and the resulting network scan provides a foundation for generating an attack graph. New vulnerabilities are discovered daily and as is often the case, these vulnerabilities may exist for both new and old software alike.

The daily process of taking new vulnerabilities into account may trigger the process for one or more secondary devices 106A-106G to perform a self-scan and to trigger the process described herein. In order to meet the need of relevant, actionable cyber-situational awareness, it is important to have frequent updates. Some entities recommend at least daily updates, but the techniques described herein may provide for more frequent updates as needed.

Changes in network 100 occur for a number of reasons. Some of those reasons are machines being added or removed from the network, changes in the software on each machine of the network, activities associated with patching and new vulnerabilities being discovered. The changes listed here are not necessarily all encompassing, but they illustrate the need for updating the awareness of the risk posed by vulnerabilities on a network.

The changes can be monitored in a variety of ways. For network or connectivity context of a machine in the network, since the individual machines need to have context to which other machines that they are connected, an example of gaining this contextual information is using traceroute with a hop of one (1.0). This information may be stored on each of secondary computing devices 106A-106G from day-to-day, or scan-to-scan, and may be monitored to detect any changes in the connectivity. Each day machines can be added or deleted from the network. This information can be stored with a date-time-stamp to ensure detection of changes, historical information as well as the necessary context to generate the current enclave-level attack graph. The connectivity context may be transmitted to central computing device 110 to merge the individual attack graphs and serve as an addressing mechanism to ensure that the correct machines are linked within the larger enclave context.

In addition to the traceroute information, individual machine information may be transmitted to ensure the greatest possible accuracy in identifying an asset. The transmitted information may include, but may not be limited to, the hard drive serial number, the universally unique identifier (UUID), and the network basic input/output system (NetBIOS) information of the respective one of secondary computing devices 106A-106G. This would allow not only accurate identification of an asset at the time of processing, but also asset identification through time to facilitate trending.

Every day, new vulnerabilities are discovered and exploits developed. Of all the triggers, the discovery of a new vulnerability may trigger an update on a daily basis. There are a number of open-source data sets that detail each new vulnerability. For example, the National Institute of Technology (NIST), publishes, daily, the list of reported vulnerabilities in the National Vulnerability Database. This database lists vulnerabilities going back to the late 1990s. There are vulnerability scanners based on this database. On a daily basis, during a low processing time, central computing device 110 and secondary computing devices 106A-106G may download the latest vulnerabilities and check the characteristics of the vulnerabilities to see if it would trigger an update to the local attack graph or attack graph stencil. Since vulnerabilities are typically operating system dependent, not all new vulnerabilities may trigger an update. However, there is the case, that the machines may be networked with another that may receive an update and this may act as a trigger for the local machine, but the fact that this process uses attack graph stenciling to act as a bridge between networked machines already handles this on demand.

For software modifications, central computing device 110 and secondary computing devices 106A-106G may perform a daily scan for registry changes (e.g., log files, registry changes, event logs, network configuration). Software on a machine can be modified in several ways. Software can be added or deleted or updated or patched. Each one of these changes can introduce vulnerabilities to the software landscape of a machine and each one of these vulnerabilities has the potential to interact with other vulnerabilities within the machine or enclave. For example, there are a number of advanced third-party utilities available that can monitor changes to the registry. Others can monitor file or folder changes.

In order to provide the underlying data from which an attack graph is built, each of secondary computing devices 106A-106G may perform a vulnerability scan. Vulnerability scanning is a process across computational machines and communications equipment in a network to search for and identify potential vulnerabilities which may be exploitable.

A vulnerability scan typically originates with the system owners with the responsibility for the enclave security, but vulnerability scans are also used by attackers looking for points of entry into the enclave.

A vulnerability scanner runs from the end point of the person inspecting the attack surface in question. The scanning software compares details about the target attack surface to a database of information about known vulnerabilities in services and ports and anomalies in packet creation. Most vulnerability databases are incomplete due to issues of self-reporting and lag time to publish vulnerabilities, and due to attackers that hold zero-day vulnerabilities in secret to leverage or sell. Should a database of a more fundamental description of underlying execution sequences defined by the flaw or malware, then this data may replace the vulnerability database to get to the truer measure of vulnerabilities, exploits and risk.

Vulnerability scanning can be potentially problematic on the target machine's running operations or flow across a network. As a result, the scan can cause errors and reboots, thereby impacting operations.

There are two categories of vulnerability scanning: authenticated and unauthenticated scans. Unauthenticated scans perform the scan as an attacker initially would, without authenticated access to the enclave. Unauthenticated scan reveals vulnerabilities that can be accessed without officially logging into the network. Authenticated scans are from the dimension of an authenticated (or insider) user, thus revealing the vulnerabilities that are accessible to trusted users, or an attacker that has gained access as a trusted user. Both techniques may be utilized to maximize the utility of actionable cyber situational awareness results of the enclave to be protected.

Ultimately the results of both types of vulnerability scans are used as the see information from which to build the enclave level attack graph. In this situation, a machine level vulnerability scan takes place and the enclave level results are derived from merging the individual machine results.

The merger of two subgraphs into a single graph may involve three broad steps. The first step is an overlay of a stencil that shows the connection of vulnerabilities through their interaction between machines. The second step is ordering the individual machine's adjacency matrices to match those of the stencils. The third step is the actual merger using the individual machine's adjacency matrices and the stencil overlay.

The stencil may be created on a daily basis as the vulnerability list evolves. For example, if the National Institute of Technology (NIST) updates their National Vulnerability Database (NVD), and then the individual secondary machine 106A-106G gets an update as well as central computing device 110. The secondary machine 106A-106G may use their copy of the NIST NVD to create their individual attack graph and adjacency matrices, whereas central computing device 110 may use it to create attack graph stencils of the cross-machine vulnerability interactions in order to serve the merging process.

Central computing device 110 may create a file that resembles an actual scan result, which may actually be the template for the stencil. This template may contain the universe of the vulnerabilities on an operating-system-by-operating-system basis. The template may be of two machines, iterating through the operating system possibilities in order to create the stencil that shows the vulnerability interaction between operating system types.

Since there may be multiple adjacency matrices, each matrix element may be accompanied by not only its individual identifying information, but also with respect to its relationship to other machines it is in direct contact with. The relationship information comes from having a timestamp and the traceroute information. The timestamp may serve as a temporal signature so that it may be understood which adjacency matrix this is and at what time to properly merge the most recent adjacency matrices. The traceroute information may serve as an indicator as to which machine is connected to which machine and serve as an overarching framework from within the merge process. The process may include merging two individual adjacency matrices, but this may be generalizable to any number of adjacency matrices. It may also be assumed that the identifying information addressed above may be part of the matching algorithm to account for which adjacency matrices are being processed.

Graph theory and the algebra of adjacency matrices give us a way for the merging of two subgraphs into a larger single enclave-level graph network. The techniques described herein may employ a graph-matching technique by matching one-to-one correspondence of the two subgraphs by keeping track of the originating subgraph, associated vulnerability and the vulnerability interactions across subgraph boundaries. Due to the fact that these adjacency matrices represent attack graphs, there may be the additional consideration of including interactions that are derived between vulnerabilities that exist on different machines. The attack graph stencil addresses this issue by providing the necessary edges between machine interactions and thus enable central computing device 110 to correctly assemble the cross-machine interactions between vulnerabilities. Central computing device 110 may represent a subgraph in memory as an adjacency matrix. Graph theory provides three algorithms for merging of two subgraphs. Algorithm-I explains about finding the order of merged graph network of two subgraphs. Algorithm-II explains about creation of adjacency matrix machine-level subgraph. These adjacency matrices of these graphs are used in Algorithm-III. Algorithm-III explains about creation of merged adjacency matrix using the attack subgraph stencil to complete the interactions. Finally, from this adjacency matrix, central computing device 110 may construct the merged attack graphs of two attack subgraphs and the stencil. It should be noted that the below algorithms are only example algorithms using pseudocode. Alternative data structures, operations, and orders may be used to accomplish the techniques described herein, and one having ordinary skill in the art would understand that the below example algorithms are only one way of accomplishing the techniques described herein.

Algorithm I, provided below, shows the finding of an order of merged subgraphs of two attack subgraphs or an attack subgraph with the stencil then repeated with another subgraph and stencil then together:

Ordering of Merged Ensemble Matrix (CAS1, N1, CAS2, N2)

CAS1 [1:N1]: Machine-1's communities attack subgraph 1, 2, 3, . . . , N1.

CAS2 [1:N2]: Machine-2's communities attack subgraph 1, 2, 3, . . . , N2.

CMAS [1:N1+N2]: Global array to hold the merged ensemble arrays CAS1 and CAS2.

MAS [1:size, 1:size]: Global 2D-Array for representation of initial form of merged ensemble matrix.

size: The size of merged array.
1. Merge CAS1 and CAS2 and store in CMAS.
2. Arrange CMAS in ascending order.
3. Set size: =N1+N2.
4. [Remove the repeated ensemble from CMAS[]]

```
(i)      Repeat for I = 1, 2, ......,size-1:
(ii)     If CMAS [I] = CMAS [I+1],
(iii)    Then
(iv)     [Shift one step left all ensembles]
              a. Repeat for J = I+1, I+2,......,size:
                  i. Set CMAS [J-1] := CMAS [J].
              b. End for
           2. (b) Set size := size-1.
           3. (c) Set I := I - 1.
         (b) End if
(v)      End for
```

5. [Initial representation of merged ensemble matrix of order size×size]

```
(i)      Repeat for I = 1, 2, ......,size:
              (a) Repeat for J = 1, 2, .....,size:
                  1. Set MAS [I][J] := 0.
              (b) End For
(ii)     End For
```

6. Return

Algorithm II, shown below, describes an Attack Graph Adjacency Matrix (CAS, Size, EMatrix):

CA [1:Size]: Array of an attack graph of dimension Size.

EMatrix [1:Size+1, 1:Size+1]: Ensemble matrix of attack subgraph (AS) of order (Size+1)×(Size+1).

0. [Attack subgraph number assignments at row and column places in ensemble matrix EMatrix[][]]

```
a) Repeat for I = 1, 2, ......,Size:
     i.       Set EMatrix [1][I+1] := CA [I].
     ii.      Set EMatrix [I+1][1] := CA [I].
b) End For
```

1. [Adjacency Matrix Creation through community matrix EMatrix[][]]

```
a) Repeat For I = 2, 3, .....,Size+1:
     i.  Repeat For J = 2, 3, ......,Size+1:
            1. If Edge from EMatrix [I][1] to EMatrix[1][J] = True,
            2. Then
```

```
                    a. Set EMatrix [I][J] := 1.
            3. Else
                    a. Set EMatrix [I][J] := 0.
            4. End If
        ii.   End For
b) End For
```

2. Return

To create an ensemble graph CAS1[1:N1]'s adjacency matrix as AS1[1:N1+1, 1:N1+1] then follow the given statement:

Call Ensemble Adjacency Matrix (CAS1, N1, AS1)

Here CAS1 attack subgraph-1's array having 1, 2, 3, . . . , N1 subgraphs.

AS1: Adjacency matrix of the ensemble graph of attack-subgraph-1 of order (N1+1)×(N1+1)]

Algorithm III, shown below, may be for merging two subgraphs adjacency matrices and in order to represent the merged ensemble adjacency matrix MV of order size×size. The initial state of matrix MV [1:size,1:size] may be created in Algorithm-1.

Merge Attack Subgraphs into an Enclave Ensemble Graph (AS1, N1, AS2, N2)

AS1 [1:N1+1, 1:N1+1]: adjacency attack subgraph matrix of order (N1+1)×(N1+1).

AS2 [1:N2+1, 1:N2+1]: adjacency attack subgraph matrix of order (N2+1)×(N2+1).

(Above both matrices formed from Algorithm-II above)

MV [1:size, 1:size]: Global 2D-Array (formed from Algorithm-I) for representation of merged ensemble matrices AS1 and AS2, of order size X size.

0. [Adding adjacency matrices V2[][] with merged ensemble matrix mas[][]]

```
i)    Repeat for i = 2, 3, ......,N1+1:
        i.   Repeat for j = 2, 3, ........, N2+1:
              1. Repeat for m = 2, 3, ........,size:
                  a. Repeat for n = 2, 3, ......,size:
                      i.    If MAS[m][1]=AS1[i][1] And
                            MAS[1][n]=AS1[1][j],
                      ii.   Then
                      iii.  Set MAS[m][n] :=MAS[m][n] OR
                            AS1[i][j]. // logical OR operation
                      iv.   Break.
                      v.    End If
                  b. End For
              2. End For
        ii.   End For
ii)   End For
```

1. [Adding adjacency matrices AS2[][] with merged ensemble matrix MAS[][]]

```
i)    Repeat for i = 2, 3, ......,N1+1:
        i.   Repeat for j = 2, 3, ........, N2+1:
              1. Repeat for m = 2, 3, ........,size:
                  a. Repeat for n = 2, 3, ......,size:
                      i.    If MV[m][1]=V2[i][1] And
                            MV[1][n]=V2[1][j],
                      ii.   Then
                      iii.  Set MV[m][n] := MV[m][n] OR V2[i][j]. //
                            logical OR operation
                      iv.   Break.
                      v.    End If
                  b. End For
              2. End For
        ii.   End For
ii)   End For
```

2. The matrix MAS[][] is the resultant merged community matrix. From it, we can draw the merged ensemble enclave graph.

3. Exit.

Graphically the algorithmic process described above may take the individual machine attack (sub)graphs generated by an internal scan.

Before central computing device 110 merges the subgraphs, the connectivity of the subgraphs may be taken into account. The connectivity information comes from identifying each individual secondary computing device 106A-106G either by hard drive serial number or IP address. IP address is not necessarily reliable over time since there is the existence of dynamic host configuration protocol (DHCP) or virtual machines. Hard drive serial number is more robust since the vulnerabilities we are concerned about exist on the hard drive. Additionally, the hard drive serial number is stable through time, so an assets vulnerability can be tracked longitudinally. When a machine detects a change through either self-monitoring or daily traceroute (1 hop) pings or network configurations, the identifying information about the individual machine and the traceroute information may identify the machine and its connections to the central collating and aggregation server.

The traceroute information may be used to build a template adjacency matrix of the entire enclave. Given the number of machines within an enclave gives us the row and column dimensions of the template. Each cell of the matrix may represent a separate machine. Each cell also represents the individual secondary computing device 106A-106G attack subgraph. A simplifying assumption may be made for programming's sake to utilize an n-×-n matrix of the attack subgraph of all vulnerabilities and then just zero-out the vulnerabilities that do not exist within that particular machine type, such as some vulnerabilities in one operating system that may not exist on some other operating systems. For performance reasons, the size of some enclaves cannot fit within RAM memory, so the Cartesian product algorithm may be employed so that only the necessary elements for adjacency matrix operations are loaded into memory and that can be supported within the memory.

The attack graph stencil provides the bridge between vulnerability inter-machine interactions. The techniques described herein provide a method to overlay the stencil of inter-machine vulnerability interactions. The ensemble enclave-level attack graph derived from the individual machine attack (sub)graph and the overlapping stencils. Once the individual machine level attack graphs are merged into the enclave level attack graph, the conditional probabilities of the attacker walking the vulnerabilities through the enclave can be computed.

The techniques described herein describe an approach to merging and aggregating vulnerability metrics in an enterprise network through machine-level probabilistic attack graphs. The techniques include the merging of sub-graphs to form a larger graph which can be used for enclave level probabilistic attack inference. Given the components of the individual attack sub-graphs, the adjoining stencil attack graphs, the triggering mechanisms and the final network-level attack graph gives a method to improve actionable cyber situational awareness results on a more frequent basis and computes a conditional probability across the attack graph for the probability of success for a vulnerability being exploited.

In accordance with the techniques described herein, secondary computing device 106A may generate a first attack graph. Secondary computing device 106A may generate this attack graph during a low usage period for secondary computing device 106A. A low usage period means a time period where one or more processors of secondary computing device 106A have a high amount of available compute cycles or where network 100 has a low bandwidth usage. Secondary computing device 106A may transmit the first attack graph from secondary computing device 106A to central computing device 110 in network 100.

Secondary computing device 106C may also generate a second attack graph, potentially during a low usage period (as with secondary computing device 106A). Secondary computing device 106C may then transmit the second attack graph from secondary computing device 106C to central computing device 110.

Central computing device 110 may generate, based on the first attack graph and the second attack graph, a network-level attack graph by merging the first attack graph, the second attack graph, and an attack graph stencil of cross-device vulnerability interactions. Central computing device 110 may also generate the attack graph stencil used in this merge. Central computing device 110 may access a comprehensive (or partial) list of known vulnerabilities. Central computing device 110 may then determine an operating system for each known secondary computing device 106A-106G in network 100. Central computing device 106A may determine each unique operating system pair based on the operating system for each secondary computing device 106A-106G. For each unique operating system pair, central computing device 106A may determine, based on the comprehensive list of known vulnerabilities, each interaction vulnerability for the respective unique operating system pair to generate the attack graph stencil of cross-device vulnerability interactions.

At a later time, secondary computing device 106A may generate a third attack graph. Rather than transmit the entire third attack graph to central computing device 110, secondary computing device 106A may take advantage of the low usage period in which the third attack graph may have been generated to generate a first delta attack graph that includes only differences between the third attack graph and the first attack graph. Secondary computing device 106A may then transmit only the first delta attack graph to central computing device 110.

Secondary computing device 106C may perform a similar process, generating a fourth attack graph. Secondary computing device 106C may then generate a second delta attack graph that includes only differences between the fourth attack graph and the second attack graph and transmit the second delta attack graph to central computing device 110.

Central computing device 110 may receive the first delta attack graph from secondary computing device 106A and the second delta attack graph from secondary computing device 106C. Central computing device 110 may construct the third attack graph from the first attack graph and the first delta attack graph. Central computing device 110 may also construct the fourth attack graph from the second attack graph and the second delta attack graph. Central computing device 110 may then generate, based on the third attack graph and the fourth attack graph, a second network-level attack graph by merging the third attack graph, the fourth attack graph, and a second attack graph stencil of cross-device vulnerability interactions. The second attack graph stencil may either be a same attack graph stencil as the first attack graph stencil or may include any updates that may have been determined between generating the first network-level attack graph and generating the second network-level attack graph.

This method leverages each of the machine-level assets within an enclave to generate its own attack graph and then by sharing the data with a central processing unit, can generate an enclave-wide probabilistic attack graph. The benefits of this method are that by distributing part of the attack graph generation to individual machines, the computational load is shared during low compute-activity and low network-activity times and thus more frequent cyber-situational awareness can be gained for a daily or even more frequent period. The benefit of more frequent scanning cannot be over-stated especially if the computational and network loads are reduced. Another benefit to this method is that each machine in the enclave can provide its' perspective of itself in the network versus a more assumed perspective based on network tools. Furthermore, the individual machines in the separate enclaves can produce updated attack graphs, compare the updated attack graphs to prior attack graphs, and only transmit the differences between those two attack graphs to the central processing unit, thereby reducing the amount of overall network traffic by reducing the amount of data transmitted between those devices over the network.

Figure 2:
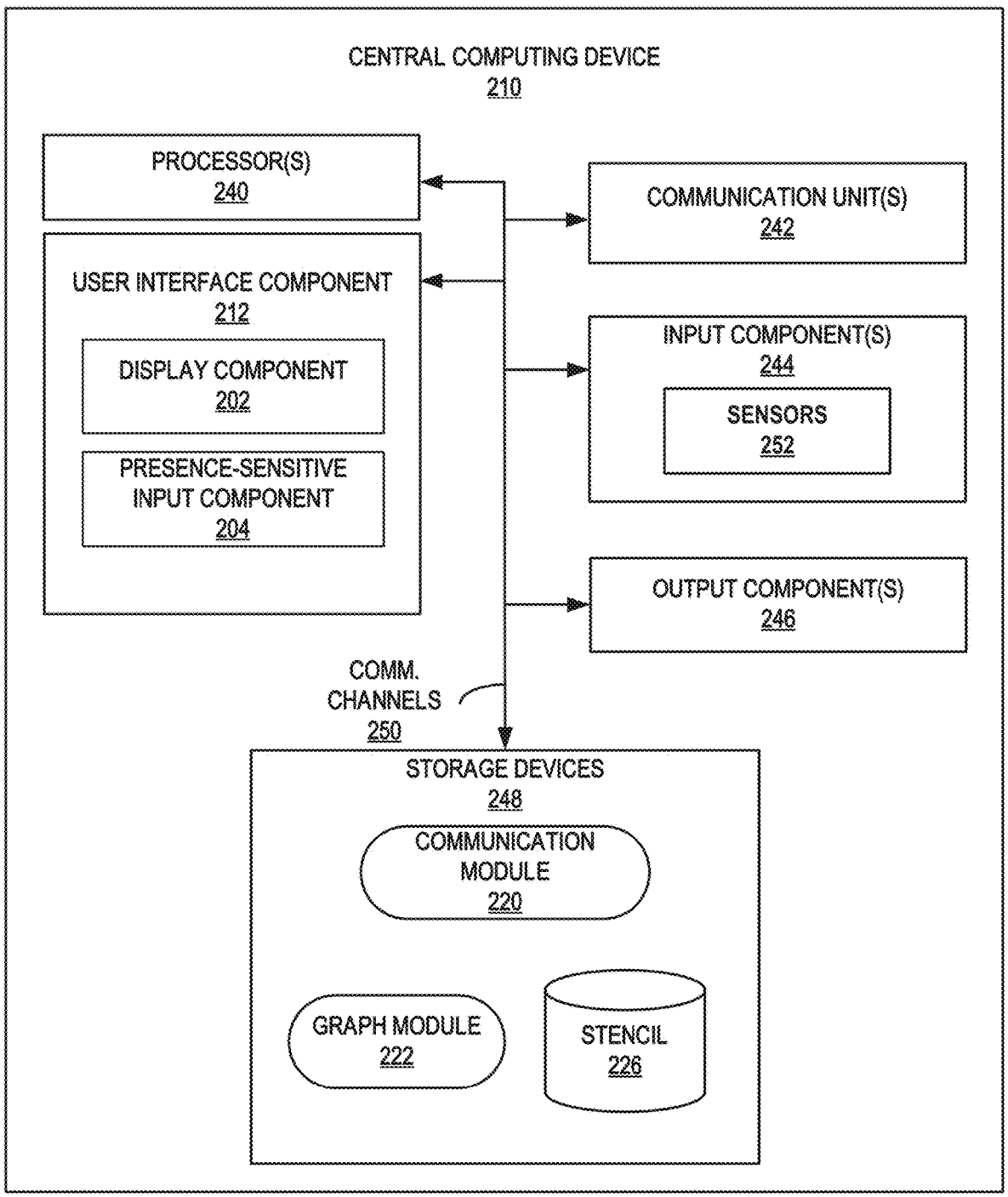
FIG. 2 is a block diagram illustrating a more detailed example of a central computing device configured to perform the techniques described herein.

FIG. 2 is a block diagram illustrating a more detailed example of a central computing device configured to perform the techniques described herein. Central computing device 210 of FIG. 2 is described below as an example of central computing device 110 of FIG. 1. FIG. 2 illustrates only one particular example of central computing device 210, and many other examples of central computing device 210 may be used in other instances and may include a subset of the components included in example central computing device 210 or may include additional components not shown in FIG. 2.

As shown in the example of FIG. 2, central computing device 210 includes user interface device (UID) 212, one or more processors 240, one or more communication units 242, one or more input components 244, one or more output components 246, and one or more storage components 248. UID 212 includes display component 202 and presence-sensitive input component 204. Storage components 248 of central computing device 210 include communication module 220, graph module 222, and stencil data store 226.

One or more processors 240 may implement functionality and/or execute instructions associated with central computing device 210 to generate an attack graph stencil and a network-level attack graph. Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of central computing device 210. For example, processors 240 of central computing device 210 may retrieve and execute instructions stored by storage components 248 that cause processors 240 to perform the operations described with respect to modules 220 and 222. The instructions, when executed by processors 240, may cause central computing device 210 to generate an attack graph stencil and a network-level attack graph.

Communication module 220 may perform operations for communicating with outside computing devices and enclaves, such as secondary computing devices 106A-106G in respective enclaves 102A-102C. For example, UI module 220 of central computing device 210 may receive local attack graphs from various secondary computing devices 106A-106G, which are merged together with an attack graph stencil to generate the network-level attack graph.

In some examples, graph module 222 may execute locally (e.g., at processors 240) to provide functions associated with generating an attack graph stencil and a network-level attack graph. In some examples, graph module 222 may act as an interface to a remote service accessible to central computing device 210. For example, graph module 222 may each be an interface or application programming interface (API) to a remote server that generates an attack graph stencil and a network-level attack graph.

One or more storage components 248 within central computing device 210 may store information for processing during operation of central computing device 210 (e.g., central computing device 210 may store data accessed by modules 220 and 222 and stencil data store 226 during execution at central computing device 210). In some examples, storage component 248 is a temporary memory, meaning that a primary purpose of storage component 248 is not long-term storage. Storage components 248 on central computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and stencil data store 226. Storage components 248 may include a memory configured to store data or other information associated with modules 220 and 222 and stencil data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of central computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of central computing device 210 may receive input. Examples of input are tactile, audio, and video input. Input components 244 of central computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components 252 one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of central computing device 210 may generate output in a selected modality. Examples of modalities may include a tactile notification, audible notification, visual notification, machine generated voice notification, or other modalities. Output components 246 of central computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UID 212 of central computing device 210 may include display component 202 and presence-sensitive input component 204. Display component 202 may be a screen, such as any of the displays or systems described with respect to output components 246, at which information (e.g., a visual indication) is displayed by UID 212 while presence-sensitive input component 204 may detect an object at and/or near display component 202.

While illustrated as an internal component of central computing device 210, UID 212 may also represent an external component that shares a data path with central computing device 210 for transmitting and/or receiving input and output. For instance, in one example, UID 212 represents a built-in component of central computing device 210 located within and physically connected to the external packaging of central computing device 210 (e.g., a screen on a mobile phone). In another example, UID 212 represents an external component of central computing device 210 located outside and physically separated from the packaging or housing of central computing device 210 (e.g., a monitor, a projector, etc. that shares a wired and/or wireless data path with central computing device 210).

UID 212 of central computing device 210 may detect two-dimensional and/or three-dimensional gestures as input from a user of central computing device 210. For instance, a sensor of UID 212 may detect a user's movement (e.g., moving a hand, an arm, a pen, a stylus, a tactile object, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

In accordance with the techniques of this disclosure, communication module 220 may receive the first attack graph from a first secondary computing device and the second attack graph from a second, different secondary computing device. Upon receiving these attack graphs, graph module 222 may generate, based on the first attack graph and the second attack graph, a network-level attack graph by merging the first attack graph, the second attack graph, and an attack graph stencil of cross-device vulnerability interactions.

In some instances, graph module 222 may also generate the attack graph stencil. In such instances, the network further includes a plurality of computing devices (including secondary computing device 306 and the additional secondary computing device), and generating the attack graph stencil includes graph module 222 accessing a comprehensive (or partial) list of known vulnerabilities. Graph module 222 may determine an operating system for each computing device of the plurality of computing devices in the network. Graph module 222 then may determine each unique operating system pair based on the operating system for each computing device of the plurality of computing devices. For each unique operating system pair, graph module 222 may determine, based on the comprehensive list of known vulnerabilities, each interaction vulnerability for the respective unique operating system pair, thereby forming the attack graph stencil. The operating system may be one or more of an operating system family and a version number installed on the respective computing device of the plurality of computing devices.

In some instances, the first and second secondary computing devices may generate a first delta attack graph and a second delta attack graph, respectively, when central computing device 210 is to update the network-level attack graph to generate a second, subsequent network-level attack graph. Communication module 220 may receive only the first delta attack graph and the second delta attack graph during the process of generating a second, updated network-level attack graph. Graph module 222 may construct third attack graph from the first attack graph and the first delta attack graph to get an updated picture of the vulnerabilities recognized by the first secondary computing device, and may construct the fourth attack graph from the second attack graph and the second delta attack graph to get an updated picture of the vulnerabilities recognized by the second secondary computing device. Graph module 222 may then generate, based on the third attack graph and the fourth attack graph, a second network-level attack graph by merging the third attack graph, the fourth attack graph, and a second attack graph stencil of cross-device vulnerability interactions. The second attack graph stencil from attack graph stencils data store 226 may either be a same attack graph stencil as the first attack graph stencil or may include any updates that may have been determined between generating the first network-level attack graph and generating the second network-level attack graph.

Graph module 222 may utilize any number of attack graphs generated by separate secondary devices when merging local attack graphs with the attack graph stencil to generate the network-level attack graph. For instance, one or more additional secondary computing devices may each generate an additional attack graph for the respective additional secondary computing device. Each of these additional secondary computing devices may transmit the respective additional attack graph from the respective additional computing device to central computing device 210. Communication module 220 may receive each of these additional attack graphs. Graph module 222 may then generate the network-level attack graph by merging all of the first attack graph, the second attack graph, each of the one or more additional attack graphs, and the attack graph stencil.

Figure 3:
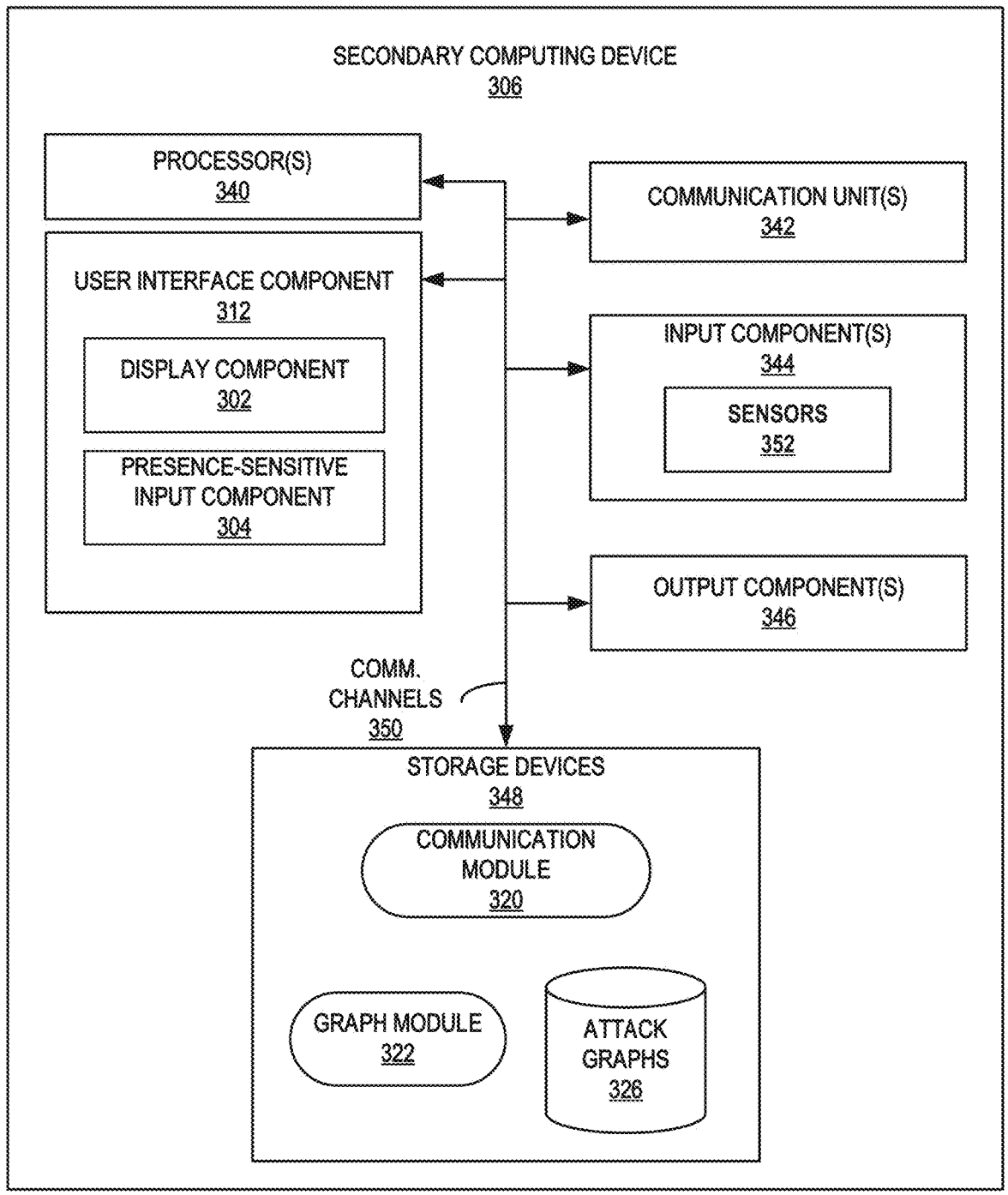
FIG. 3 is a block diagram illustrating a more detailed example of a secondary computing device configured to perform the techniques described herein.

FIG. 3 is a block diagram illustrating a more detailed example of a secondary computing device 306 configured to perform the techniques described herein. Secondary computing device 306 of FIG. 3 is described below as an example of secondary computing devices 106A-106G of FIG. 1. FIG. 3 illustrates only one particular example of secondary computing device 306, and many other examples of secondary computing device 306 may be used in other instances and may include a subset of the components included in example secondary computing device 306 or may include additional components not shown in FIG. 3.

As shown in the example of FIG. 3, secondary computing device 306 includes user interface device (UID) 312, one or more processors 340, one or more communication units 342, one or more input components 344, one or more output components 346, and one or more storage components 348. UID 312 includes display component 302 and presence-sensitive input component 304. Storage components 348 of secondary computing device 306 include communication module 320, graph module 322, and attack graph data store 326.

One or more processors 340 may implement functionality and/or execute instructions associated with secondary computing device 306 to generate a local attack graph either for secondary computing device 306 or for all or a portion of the enclave that includes secondary computing device 306. Examples of processors 340 include application processors, display controllers, auxiliary processors, one or more sensor hubs, and any other hardware configure to function as a processor, a processing unit, or a processing device. Modules 320 and 322 may be operable by processors 340 to perform various actions, operations, or functions of secondary computing device 306. For example, processors 340 of secondary computing device 306 may retrieve and execute instructions stored by storage components 348 that cause processors 340 to perform the operations described with respect to modules 320 and 322. The instructions, when executed by processors 340, may cause secondary computing device 306 to generate a local attack graph and transmit the graph to a central computing device (e.g., central computing device 110 of FIG. 1).

Communication module 320 may perform processes for communicating with outside computing devices. For example, communication module 320 of secondary computing device 306 may transmit local attack graphs to a central computing device.

In some examples, graph module 322 may execute locally (e.g., at processors 340) to provide functions associated with generating the local attack graphs. In some examples, graph module 322 may act as an interface to a remote service accessible to secondary computing device 306. For example, graph module 322 may be an interface or application programming interface (API) to a remote server that generates local attack graphs for secondary computing device 306.

One or more storage components 348 within secondary computing device 306 may store information for processing during operation of secondary computing device 306 (e.g., secondary computing device 306 may store data accessed by modules 320 and 322 and attack graphs data store 326 during execution at secondary computing device 306). In some examples, storage component 348 is a temporary memory, meaning that a primary purpose of storage component 348 is not long-term storage. Storage components 348 on secondary computing device 306 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 348, in some examples, also include one or more computer-readable storage media. Storage components 348 in some examples include one or more non-transitory computer-readable storage mediums. Storage components 348 may be configured to store larger amounts of information than typically stored by volatile memory. Storage components 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 348 may store program instructions and/or information (e.g., data) associated with modules 320 and 322 and attack graphs data store 326. Storage components 348 may include a memory configured to store data or other information associated with modules 320 and 322 and attack graphs data store 326.

Communication channels 350 may interconnect each of the components 312, 340, 342, 344, 346, and 348 for inter-component communications (physically, communicatively, and/or operatively). In some examples, communication channels 350 may include a system bus, a network connection, an inter-process communication data structure, or any other method for communicating data.

One or more communication units 342 of secondary computing device 306 may communicate with external devices via one or more wired and/or wireless networks by transmitting and/or receiving network signals on one or more networks. Examples of communication units 342 include a network interface card (e.g. such as an Ethernet card), an optical transceiver, a radio frequency transceiver, a GPS receiver, or any other type of device that can send and/or receive information. Other examples of communication units 342 may include short wave radios, cellular data radios, wireless network radios, as well as universal serial bus (USB) controllers.

One or more input components 344 of secondary computing device 306 may receive input. Examples of input are tactile, audio, and video input. Input components 344 of secondary computing device 306, in one example, includes a presence-sensitive input device (e.g., a touch sensitive screen, a PSD), mouse, keyboard, voice responsive system, camera, microphone or any other type of device for detecting input from a human or machine. In some examples, input components 344 may include one or more sensor components 352 one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 346 of secondary computing device 306 may generate output in a selected modality. Examples of modalities may include a tactile notification, audible notification, visual notification, machine generated voice notification, or other modalities. Output components 346 of secondary computing device 306, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UID 312 of secondary computing device 306 may include display component 302 and presence-sensitive input component 304. Display component 302 may be a screen, such as any of the displays or systems described with respect to output components 346, at which information (e.g., a visual indication) is displayed by UID 312 while presence-sensitive input component 304 may detect an object at and/or near display component 302.

While illustrated as an internal component of secondary computing device 306, UID 312 may also represent an external component that shares a data path with secondary computing device 306 for transmitting and/or receiving input and output. For instance, in one example, UID 312 represents a built-in component of secondary computing device 306 located within and physically connected to the external packaging of secondary computing device 306 (e.g., a screen on a mobile phone). In another example, UID 312 represents an external component of secondary computing device 306 located outside and physically separated from the packaging or housing of secondary computing device 306 (e.g., a monitor, a projector, etc. that shares a wired and/or wireless data path with secondary computing device 306).

UID 312 of secondary computing device 306 may detect two-dimensional and/or three-dimensional gestures as input from a user of secondary computing device 306. For instance, a sensor of UID 312 may detect a user's movement (e.g., moving a hand, an arm, a pen, a stylus, a tactile object, etc.) within a threshold distance of the sensor of UID 312. UID 312 may determine a two or three-dimensional vector representation of the movement and correlate the vector representation to a gesture input (e.g., a hand-wave, a pinch, a clap, a pen stroke, etc.) that has multiple dimensions. In other words, UID 312 can detect a multi-dimension gesture without requiring the user to gesture at or near a screen or surface at which UID 312 outputs information for display. Instead, UID 312 can detect a multi-dimensional gesture performed at or near a sensor which may or may not be located near the screen or surface at which UID 312 outputs information for display.

In accordance with the techniques of this disclosure, graph module 322 may generate a local attack graph, which may be stored in attack graphs data store 326. This attack graph may be a probabilistic attack graph that include ranked vulnerabilities, or may be a multiplex attack graph. The one or more nodes of the attack graph each indicate a vulnerability for either secondary computing device 306, a network connection for secondary computing device 306, or another secondary computing device or network connection in the same enclave as secondary computing device 306. The one or more edges of the attack graph each indicate a logical connection between two of the vulnerabilities, where one or more of the logical connections may include a condition. In addition to the vulnerabilities and connections, the attack graphs may also include timestamps.

In some instances, graph module 322 may generate the respective attack graphs during times of low usage, such as where a high amount of CPU cycles in processors 340 are available or when the network that includes secondary 306 has a low bandwidth usage. As such, graph module 322 may determine a low usage period for secondary computing device 306, wherein the low usage period is a time period where processors 340 of secondary computing device 306 have a high amount of available compute cycles and/or where the network has a low bandwidth usage. Graph module 322 may then generate the first attack graph occurs during the low usage period for secondary computing device 306.

In some instances of generating the first attack graph, graph module 322 may determine a set of connected devices as all other computing devices in the network where a traceroute distance between secondary computing device 306 and the other computing device is equal to 1 hop. Graph module 322 may then perform one or more scans for vulnerabilities within secondary computing device 306, as well as one or more scans for vulnerabilities in connections between secondary computing device 306 and each connected device of the set of connected device. Graph module 322 may then generate the first attack graph based on the vulnerabilities within the first computing device and the vulnerabilities in connections between secondary computing device 306 and each connected device of the set of connected device. In such instances, each of the one or more scans for vulnerabilities within secondary computing device 306 and each of the one or more scans for the vulnerabilities in connections between secondary computing device 306 and each connected device of the set of connected device is either an authenticated scan or an unauthenticated scan.

In other instances, secondary computing device 306 may be in a first enclave. In such instances, the first attack graph generated by graph module 322 may indicate vulnerabilities throughout the first enclave.

Communication module 320 may transmit the first attack graph from secondary computing device 306 to a central computing device (e.g., central computing device 210) in the network, which may generate the network-level attack graph.

In some instances, graph module 322 of secondary computing device 306 may further generate a second attack graph at a later time than the generation of the first attack graph. Graph module 322 may then generate a first delta attack graph that includes only differences between the second attack graph and the first attack graph. Communication module 320 may then transmit the first delta attack graph from secondary computing device 306 to the central computing device 210 rather than transmitting the entirety of the second attack graph, as most nodes in the attack graphs are likely to be relatively static in nature.

Figure 4:
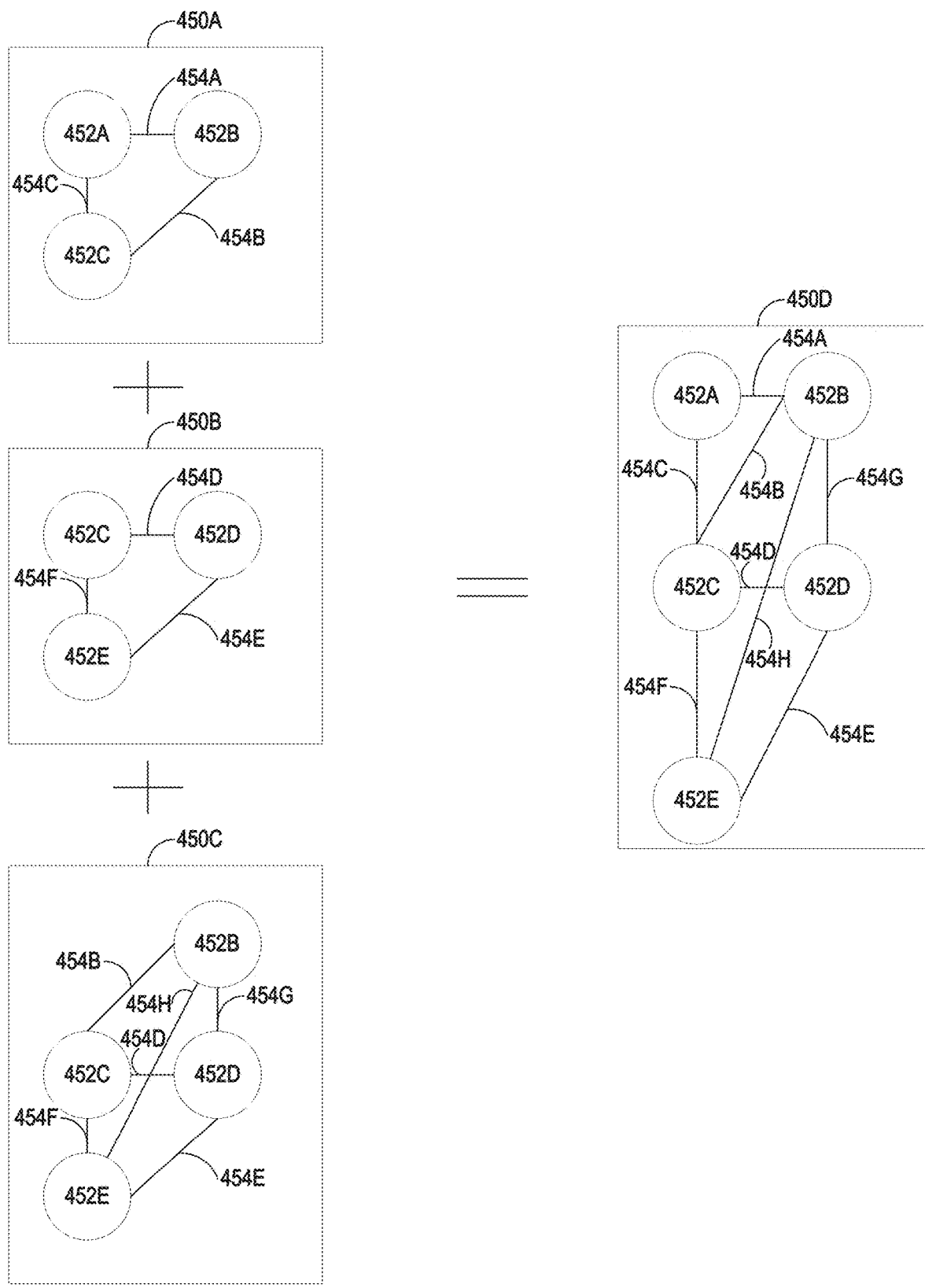
FIG. 4 is a conceptual diagram illustrating a merging of two attack graphs and an attack graph stencil to produce a network-level attack graph, in accordance with one or more techniques described herein.

FIG. 4 is a conceptual diagram illustrating a merging of two attack graphs 450A-450B and an attack graph stencil 450C to produce a network-level attack graph 450D, in accordance with one or more techniques described herein. Attack graph 450A may be generated by a first computing device, such as secondary computing device 106A of FIG. 1.

As shown in attack graph 450A, the first computing device has found three connected vulnerabilities, represented as vulnerability nodes 452A-452C with logical connections 454A-454C.

A second computing device, such as secondary computing device 106B of FIG. 1, may generate attack graph 450B. Attack graph 450B includes same vulnerability node 452C as attack graph 450A, but also includes vulnerability nodes 452D-452E and three new logical connections 454D-454F.

The central computing device (e.g., central computing device 110) may generate attack graph stencil 450C locally with information based on known interactions in the network and known operating systems within the network. However, the central computing device may not be aware of every possible interaction between operating systems within the network, giving the central computing device only a portion of the entire interaction potential. As such, attack graph stencil 450C only includes vulnerability nodes 452B-452E and logical connections 454B and 454D-H.

The first and second computing devices transmit attack graphs 450A and 450B, respectively, to the central computing device, which may merge attack graphs 450A and 450B with attack graph stencil 450C to generate network-level attack graph 450D. Attack graph stencil 450C includes most of the information for the network, including each vulnerability node and logical connection in attack graph 450B. However, attack graph 450A also includes vulnerability node 452A and logical connections 454A and 454C. As such, during the merging, the central computing device adds vulnerability node 452A and logical connections 454A and 454C to the attack graph stencil 450C to obtain a more complete network-level attack graph 450D while also distributing the processing across multiple devices rather than calculating the entire network-level attack graph on the central computing device.

An attack graph (e.g., attack graphs 450A-450B) is a network structure, subject to graph theory, where its nodes are a combination of vulnerability findings, attack steps, and aggregated nodes, and the relationship between them can be represented using vertices and arcs. This network structure allows us to reason about the elements of the attack graph and how they relate to one another. One way to reason about the elements of the attack graph and their arcs is to compute a conditional probability of an attack path through the attack graph network.

Here we denote n for number of vertices and m for number of arcs. When an arc, a directional edge, is created by using two vertices u and v, which is represented by uv, then the initial vertex is the u and the terminal vertex is the v in the arc uv.

A graph G=(V, A) with V={v1, v2, vn} whose adjacency matrix A is the n×n square matrix $((a_{ij}))$ where $a_{ij}$ is 1 or 0 depending on whether there is an arc (1) or not (0) between $v_i$ and $v_j$ ($v_iv_j$). In the case of a probabilistic attack graph the value is $0.0<=a_{ij}<=1.0$.

A sub-digraph of G to be (V1, A1) where V1 is a subset V, A1 is a subset A and if uv is an element of A1 then u and v belong to V1.

The converse of a digraph G=(V, A) is the digraph H with the same vertex set V, uv being an arc in H if and only if vu is an arc of G. Note that the adjacency matrix of the converse of G is the transpose AT of the adjacency matrix A of G.

A digraph G is said to be symmetric if vu is an arc whenever uv is an arc. G is symmetric if and only if its adjacency matrix is a symmetric matrix. G is said to be asymmetric (or anti-symmetric) if vu is not an arc whenever uv is an arc.

$A=(N_d, N_p, N_{df}, E, M_{nl}, G)$ is an attack graph, where $N_d$, $N_p$, $N_{df}$ are called derived nodes, primitive and derived fact nodes respectively; $E \subseteq ((N_p \cup N_{df}) \times N_d) \cup (N_d \times N_{df})$; $M_{nl}$ is a mapping from a node to its label; $G \subseteq N_{df}$ is an attacker's final goals.

A derived node, $N_d$, consists of facts derived by applying an interaction rule to other primitive facts and prior derived facts. An interaction between vulnerabilities is called a derived node.

Figure 5:
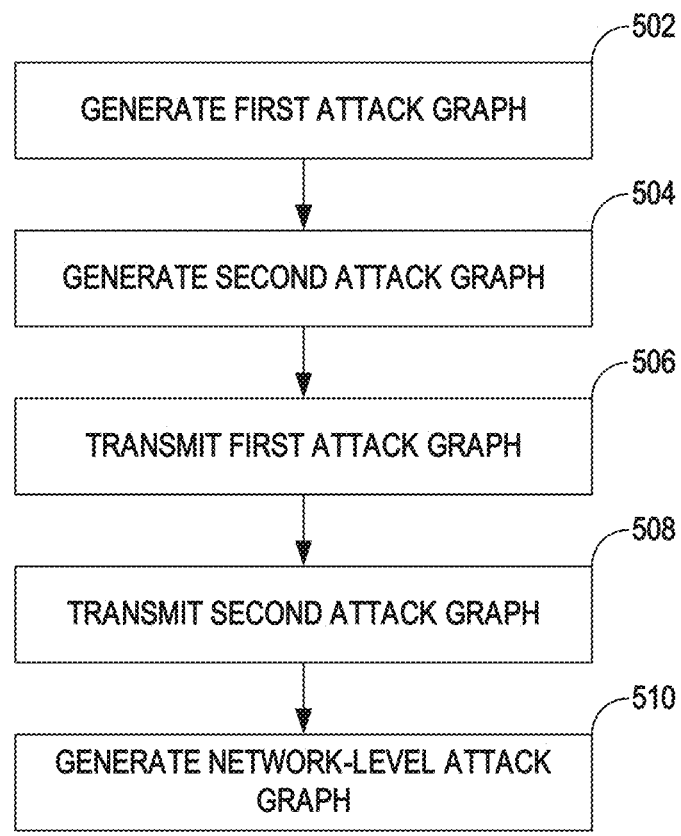
FIG. 5 is a flow chart illustrating an example network-level attack graph generation process, in accordance with one or more techniques described herein.

FIG. 5 is a flow chart illustrating an example network-level attack graph generation process, in accordance with one or more techniques described herein. The techniques of FIG. 5 may be performed by one or more processors of various computing devices, such as central computing devices 110 of FIGS. 1 and 210 of FIG. 2 and secondary computing devices 106A-106G of FIGS. 1 and 306 of FIG. 3. For purposes of illustration only, the techniques of FIG. 5 are described within the context of central computing device 210 of FIG. 2 and secondary computing device 306 of FIG. 3, although computing devices having configurations different than that of central computing device 210 and secondary computing device 306 may perform the techniques of FIG. 5.

In accordance with the techniques described herein, graph module 322 may generate a first attack graph (502). Another secondary computing device, different than secondary computing device 306, may generate a second attack graph (504). These attack graphs may be probabilistic attack graphs that include ranked vulnerabilities, or may be multiplex attack graphs. The one or more nodes of the attack graphs each indicate a vulnerability for the respective secondary computing device or a network connection for respective secondary computing device. The one or more edges of the attack graphs each indicate a logical connection between two of the vulnerabilities, where one or more of the logical connections may include a condition. In addition to the vulnerabilities and connections, the attack graphs may also include timestamps.

In some instances, graph module 322 and the additional secondary computing device may generate the respective attack graphs during times of low usage, such as where a high amount of CPU cycles are available or when the network has a low bandwidth usage. As such, graph module 322 may determine a low usage period for secondary computing device 306, wherein the low usage period is a time period where processors 340 of secondary computing device 306 have a high amount of available compute cycles and/or where the network has a low bandwidth usage. Graph module 322 may then generate the first attack graph occurs during the low usage period for secondary computing device 306.

In some instances of generating the first attack graph, graph module 322 may determine a set of connected devices as all other computing devices in the network where a traceroute distance between secondary computing device 306 and the other computing device is equal to 1 hop. Graph module 322 may then perform one or more scans for vulnerabilities within secondary computing device 306, as well as one or more scans for vulnerabilities in connections between secondary computing device 306 and each connected device of the set of connected device. Graph module 322 may then generate the first attack graph based on the vulnerabilities within the first computing device and the vulnerabilities in connections between secondary computing device 306 and each connected device of the set of connected device. In such instances, each of the one or more scans for vulnerabilities within secondary computing device 306 and each of the one or more scans for the vulnerabilities in connections between secondary computing device 306 and each connected device of the set of connected device is either an authenticated scan or an unauthenticated scan.

In other instances, secondary computing device 306 may be in a first enclave, and the additional secondary computing device is in a second enclave different than the first enclave. In such instances, the first attack graph generated by graph module 322 may indicate vulnerabilities throughout the first enclave, while the second attack graph indicates vulnerabilities throughout the second enclave. In other instances, both secondary computing device 306 and the additional secondary computing device are both located in a same enclave.

Communication module 320 may transmit the first attack graph from secondary computing device 306 to central computing device 210 in the network (506). Central computing device 210 may be either a same type of computing device as secondary computing device 306 or a central server or processing unit. The additional secondary device may transmit the second attack graph from the additional secondary computing device to central computing device 210 (508).

Communication module 220 may receive the first attack graph from secondary computing device 306 and the second attack graph from the additional secondary computing device. Upon receiving these attack graphs, graph module 222 may generate, based on the first attack graph and the second attack graph, a network-level attack graph by merging the first attack graph, the second attack graph, and an attack graph stencil of cross-device vulnerability interactions (510).

In some instances, graph module 222 may also generate the attack graph stencil. In such instances, the network further includes a plurality of computing devices (including secondary computing device 306 and the additional secondary computing device), and generating the attack graph stencil includes graph module 222 accessing a comprehensive list of known vulnerabilities. Graph module 222 may determine an operating system for each computing device of the plurality of computing devices in the network. Graph module 222 then may determine each unique operating system pair based on the operating system for each computing device of the plurality of computing devices. For each unique operating system pair, graph module 222 may determine, based on the comprehensive list of known vulnerabilities, each interaction vulnerability for the respective unique operating system pair, thereby forming the attack graph stencil. The operating system may one or more of an operating system family and a version number installed on the respective computing device of the plurality of computing devices.

In some instances, graph module 322 of secondary computing device 306 may further generate a third attack graph. Graph module 322 may then generate a first delta attack graph that includes only differences between the third attack graph and the first attack graph. Communication module 320 may then transmit the first delta attack graph from secondary computing device 306 to central computing device 210. The additional secondary computing device may follow a similar process, generating a fourth attack graph, generating a second delta attack graph that includes only differences between the fourth attack graph and the second attack graph, and transmitting the second delta attack graph from the additional secondary computing device to central computing device 210. Communication module 220 may receive only the first delta attack graph and the second delta attack graph during the process of generating a second, updated network-level attack graph. Graph module 222 may construct the third attack graph from the first attack graph and the first delta attack graph, and may construct the fourth attack graph from the second attack graph and the second delta attack graph. Graph module 222 may then generate, based on the third attack graph and the fourth attack graph, a second network-level attack graph by merging the third attack graph, the fourth attack graph, and a second attack graph stencil of cross-device vulnerability interactions.

Graph module 222 may utilize any number of attack graphs generated by separate secondary devices when merging local attack graphs with the attack graph stencil to generate the network-level attack graph. For instance, one or more additional secondary computing devices may each generate an additional attack graph for the respective additional secondary computing device. Each of these additional secondary computing devices may transmit the respective additional attack graph from the respective additional computing device to central computing device 210. Communication module 220 may receive each of these additional attack graphs. Graph module 222 may then generate the network-level attack graph by merging all of the first attack graph, the second attack graph, each of the one or more additional attack graphs, and the attack graph stencil.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
generating, by a first computing device in a network, a first attack graph;
generating, by a second computing device in the network, a second attack graph, wherein the second computing device is different than the first computing device;
transmitting, by the first computing device, the first attack graph from the first computing device to a third computing device in the network, wherein the third computing device is different than the first computing device and the second computing device;
transmitting, by the second computing device, the second attack graph from the second computing device to the third computing device; and
generating, by the third computing device and based on the first attack graph and the second attack graph, a network-level attack graph by merging the first attack graph, the second attack graph, and an attack graph stencil of cross-device vulnerability interactions,
wherein the network-level attack graph comprises a first network-level attack graph, and wherein the method further comprises, after generating the first network-level attack graph:
generating, by the first computing device, a third attack graph;

generating, by the first computing device, a first delta attack graph that includes only differences between the third attack graph and the first attack graph;

transmitting, by the first computing device, the first delta attack graph from the first computing device to the third computing device;

generating, by the second computing device, a fourth attack graph;

generating, by the second computing device, a second delta attack graph that includes only differences between the fourth attack graph and the second attack graph;

transmitting, by the second computing device, the second delta attack graph from the second computing device to the third computing device;

constructing, by the third computing device, the third attack graph from the first attack graph and the first delta attack graph;

constructing, by the third computing device, the fourth attack graph from the second attack graph and the second delta attack graph; and generating, by the third computing device and based on the third attack graph and the fourth attack graph, a second network-level attack graph by merging the third attack graph, the fourth attack graph, and a second attack graph stencil of cross-device vulnerability interactions.

2. The method of claim 1, wherein the first attack graph comprises a probabilistic attack graph that includes ranked vulnerabilities.

3. The method of claim 1, wherein the first attack graph comprises a multiplex attack graph.

4. The method of claim 1, further comprising:
determining, by the first computing device, a low usage period for the first computing device, wherein the low usage period comprises a time period where one or more processors of the first computing device have a high amount of available compute cycles or where the network has a low bandwidth usage,
wherein generating the first attack graph occurs during the low usage period for the first computing device.

5. The method of claim 1, wherein generating the first attack graph comprises:
determining, by the first computing device, a set of connected devices as all other computing devices in the network where a traceroute distance between the first computing device and the other computing device is equal to 1 hop;
performing, by the first computing device, one or more scans for vulnerabilities within the first computing device;
performing, by the first computing device, one or more scans for vulnerabilities in connections between the first computing device and each connected device of the set of connected devices; and
generating, by the first computing device, the first attack graph based on the vulnerabilities within the first computing device and the vulnerabilities in connections between the first computing device and each connected device of the set of connected devices.

6. The method of claim 5, wherein each of the one or more scans for vulnerabilities within the first computing device and each of the one or more scans for the vulnerabilities in connections between the first computing device and each connected device of the set of connected devices comprise either an authenticated scan or an unauthenticated scan.

7. The method of claim 1, further comprising:
generating, by the third computing device, the attack graph stencil.

8. The method of claim 7, wherein the network comprises a plurality of computing devices, wherein the plurality of computing devices includes the first computing device and the second computing device, and wherein generating the attack graph stencil comprises:
accessing, by the third computing device, a comprehensive list of known vulnerabilities;
determining, by the third computing device, an operating system for each computing device of the plurality of computing devices in the network;
determining, by the third computing device, each unique operating system pair based on the operating system for each computing device of the plurality of computing devices; and
for each unique operating system pair, determining, by the third computing device and based on the comprehensive list of known vulnerabilities, each interaction vulnerability for the respective unique operating system pair.

9. The method of claim 8, wherein the operating system comprises one or more of an operating system family and a version number.

10. The method of claim 1, wherein one or more nodes of the first attack graph each comprise a vulnerability for one or more of the first computing device, a network connection for the first computing device, another computing device in a same enclave as the first computing device, and a network connection for the another computing device in the same enclave as the first computing device, wherein one or more edges of the first attack graph each comprise a logical connection between two of the vulnerabilities, wherein one or more of the logical connections include a condition.

11. The method of claim 1, wherein the first computing device is in a first enclave, wherein the second computing device is in a second enclave different than the first enclave, wherein the first attack graph indicates vulnerabilities throughout the first enclave, and wherein the second attack graph indicates vulnerabilities throughout the second enclave.

12. The method of claim 1, further comprising:
generating, by each of one or more additional computing devices of the network, an additional attack graph for the respective additional computing device; and
transmitting, by each of the one or more additional computing devices, the respective additional attack graph from the respective additional computing device to the third computing device,
wherein generating the network-level attack graph comprises generating, by the third computing device and based on the first attack graph, the second attack graph, and each of the one or more additional attack graphs, the network-level attack graph by merging the first attack graph, the second attack graph, each of the one or more additional attack graphs, and the attack graph stencil.

13. The method of claim 1, wherein the first attack graph further includes a timestamp.

14. The method of claim 1, wherein the third computing device comprises a central server.

15. A system comprising:
a network comprising a plurality of computing devices;
a first computing device of the plurality of computing devices;

a second computing device of the plurality of computing devices different than the first computing device; and
a third computing device of the plurality of computing devices different than the first computing device and the second computing device,
wherein the first computing device is configured to:
  generate a first attack graph; and
  transmit the first attack graph to the third computing device,
wherein the second computing device is configured to:
  generate a second attack graph; and
  transmit the second attack graph to the third computing device,
wherein the third computing device is configured to:
  generate, based on the first attack graph and the second attack graph, a first network-level attack graph by merging the first attack graph, the second attack graph, and an attack graph stencil of cross-device vulnerability interactions,
wherein the first computing device is further configured to:
  generate a third attack graph;
  generate a first delta attack graph that includes only differences between the third attack graph and the first attack graph; and
  transmit the first delta attack graph to the third computing device,
wherein the second computing device is further configured to:
  generate a fourth attack graph;
  generate a second delta attack graph that includes only differences between the fourth attack graph and the second attack graph; and
  transmit the second delta attack graph to the third computing device; and
wherein the third computing device is further configured to:
  construct the third attack graph from the first attack graph and the first delta attack graph;
  construct the fourth attack graph from the second attack graph and the second delta attack graph; and
  generate, based on the third attack graph and the fourth attack graph, a second network-level attack graph by merging the third attack graph, the fourth attack graph, and a second attack graph stencil of cross-device vulnerability interactions.

* * * * *